United States Patent [19]

Kenny

[11] Patent Number: 4,823,917
[45] Date of Patent: Apr. 25, 1989

[54] BICYCLE CALIPER BRAKE ADJUSTING TOOL

[76] Inventor: Thomas L. Kenny, 985 Cranberry Trail, Roswell, Ga. 30076

[21] Appl. No.: 107,028

[22] Filed: Oct. 13, 1987

[51] Int. Cl.$^4$ .............................................. F16D 65/46
[52] U.S. Cl. .................................. 188/24.19; 81/484; 188/196 M
[58] Field of Search ............................ 81/484; 74/522; 188/2 D, 24.19, 71.7, 79.57, 196 M, 382; 11/11

[56] References Cited

U.S. PATENT DOCUMENTS

| | | |
|---|---|---|
| 3,036,668 | 5/1962 | Falk . |
| 3,314,504 | 4/1967 | Altenburger ...................... 188/24.19 |
| 3,628,635 | 12/1971 | Yoshigai . |
| 3,874,256 | 4/1975 | Korb et al. .............................. 81/484 |
| 3,941,215 | 3/1976 | Schoch . |
| 4,023,653 | 5/1977 | Yoshigai ................................ 188/2D |
| 4,305,482 | 12/1981 | Arai .................................... 188/24.19 |
| 4,591,026 | 5/1986 | Nagano .................................. 188/2D |
| 4,718,521 | 1/1988 | Hosokawa ........................... 188/24.19 |

FOREIGN PATENT DOCUMENTS 1277064  6/1972  United Kingdom ............ 188/24.19

*Primary Examiner*—Duane A. Reger
*Attorney, Agent, or Firm*—Fleit, Jacobson, Cohn & Price

[57] ABSTRACT

A simple hand tool is provided for clamp engagement with the "pig tail" terminal end of a bicycle hand brake cable assembly core, and an abutment is threadably supported from the tool for infinite adjustment relative thereto and is operable to engage and to displace the caliper brake arm usually clamp engaged with the cable core toward the brake arm from which the housing of the brake cable assembly is stationarily supported.

7 Claims, 1 Drawing Sheet

BICYCLE CALIPER BRAKE ADJUSTING TOOL

BACKGROUND OF THE INVENTION

1. Field of the Invention

A tool is provided and releasably engageable with the "pig tail" terminal end of the core of a bicycle hand brake cable assembly with the tool abutted against the side of a first bicycle brake arm remote from the second brake arm relative to which the housing of the cable assembly is anchored and the tool is operative to adjustably shift the first brake arm toward the second brake arm after the clamp structure on the first brake arm has been released from engagement with the cable core. In this manner, a tool is provided for greatly simplifying adjustment of bicycle caliper brakes.

2. Description of the Related Art

Various different forms of mechanisms for adjusting bicycle caliper brakes heretofore have been provided such as those disclosed in U.S. Pat. Nos. 3,036,668, 3,628,635, 3,941,215, 4,023,653, 4,305,482 and 4,591,026.

However, these previously known forms of brake adjusting mechanisms do not enable precise "slack" adjustment of cable actuated bicycle brakes and some include structures incorporated into each bicycle caliper brake.

Accordingly, a need exists for a tool which may be readily operatively associated with successive caliper brakes and utilized to effect "slack" adjustment of those caliper brakes in a minimum amount of time and with complete efficiency.

SUMMARY OF THE INVENTION

The brake adjusting tool of the instant invention comprises a three-part assembly which may be quickly engaged with the "pig tail" terminal end of a brake actuating cable assembly core, stationarily positioned relative to the "pig tail" and thereafter utilized to effect precise "slack" adjustment of the brake actuating cable assembly after the usual clamp assembly for the core of the cable assembly has been released. Thereafter, the clamp assembly may be reapplied and the tool quickly removed from the "pig tail" cable core end.

The main object of this invention is to provide a tool which will enable quick and precise "slack" adjustment of hand brake cable assemblies operatively associated with bicycle wheel caliper brakes.

Another object of this invention is to provide a tool which may be readily used even by persons having one or both hands physically disabled.

Yet another important object of this invention is to provide a tool in accordance with the preceding objects and which may be used effectively for "slack" adjusting the operating cable assembly of substantially all forms of hand cable operated caliper brakes.

A further important object of this invention is to provide a tool which is sufficiently small to enable ready storage of the tool on an associated bicycle or on a person using a bicycle.

A final object of this invention to be specifically enumerated herein is to provide a cable operated bicycle caliper brake adjusting tool in accordance with the preceding objects and which will conform to conventional forms of manufacture, be of simple construction and easy to use so as to provide a device that will be economical, long-lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENT

Figure 1:
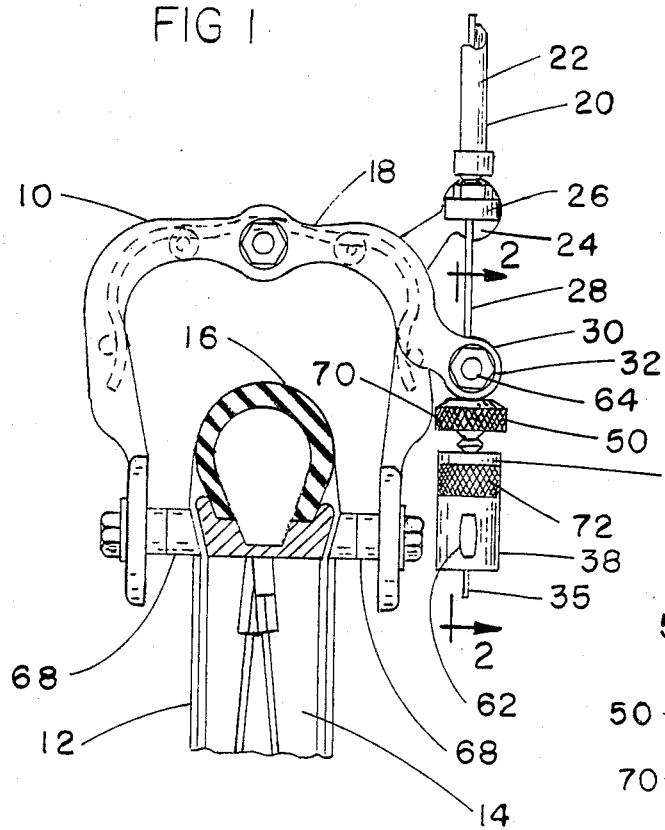
FIG. 1 is a fragmentary perspective view of the upper peripheral portion of a typical bicycle front wheel and with a caliper brake assembly operatively associated therewith and the tool of the instant invention engaged with the operating cable assembly core for "slack" adjustment of the brake assembly.
Figure 2:
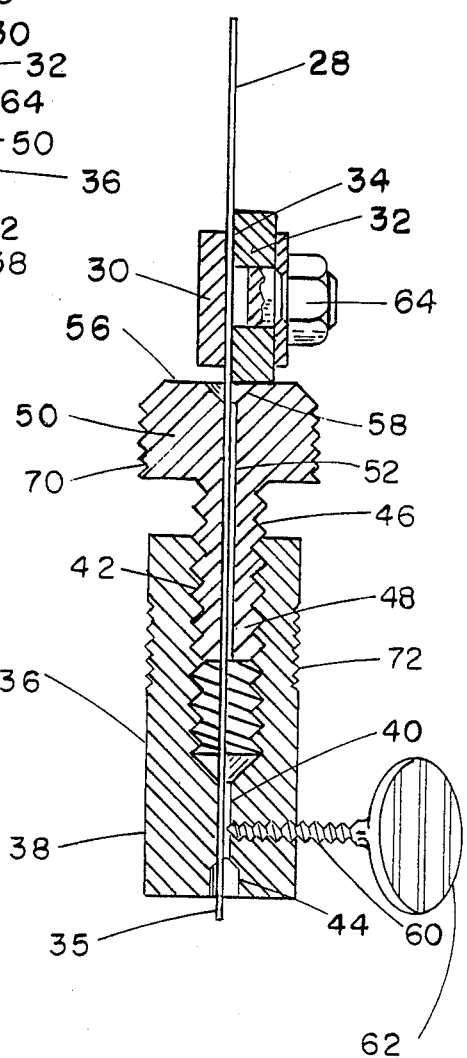
FIG. 2 is an enlarged fragmentary vertical sectional view taken substantially upon the plane indicated by the section line 2—2 of FIG. 1.
Figure 3:
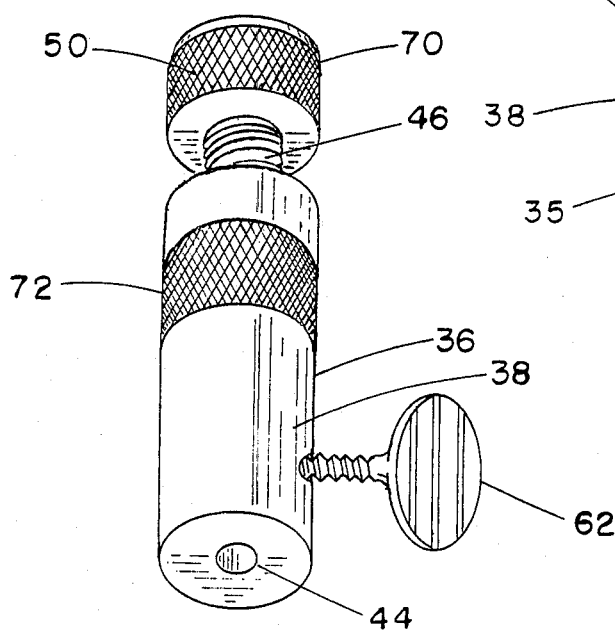
FIG. 3 is an enlarged perspective view of the tool.

Referring now more specifically to the drawings, the numeral 10 generally designates a bicycle including a front wheel referred to in general by the reference numeral 12 incorporating a spoke supported rim 14 mounting a pneumatic tire 16. The bicycle 10 additionally includes a cable operated caliper brake assembly referred to in general by the reference numeral 18 and similar to that disclosed in U.S. Pat. No. 4,305,482 and the caliper brake assembly 18 is actuated through the utilization of a cable assembly referred to in general by the reference numeral 20 including an outer housing 22 stationarily mounted relative to a first component or brake arm 24 as at 26 and a cable core 28 longitudinally slidably disposed within the outer housing 22 and anchored relative to a second component or brake arm 30 by a clamp assembly 32, the components 24 and 30 being shiftable toward and away from each other to apply and release, respectively, the brake assembly 18. The clamp assembly 32 defines a first passage 34 extending therethrough and the cable core 28 extends through the passage 34 and includes a terminal "pig tail" end 35 on the side of the arm 30 remote from the arm 24.

The tool of the instant invention is referred to in general by the reference numeral 36 and includes an elongated body 38 having a second passage 40 formed centrally longitudinally therethrough. The second passage 40 comprises a small diameter bore including an enlarged threaded counter bore 42 at one end and a second smaller diameter enlarged counter bore 44 at its other end. The tool 36 additionally includes an abutment in the form of a bolt 46 incorporating a threaded shank 48 and a diametrically enlarged head 50 on one end of the shank. A third passage 52 is formed longitudinally centrally through the bolt 46 and the shank 48 is threadedly engaged in the threaded counter bore 42 with the passage 52 registered with the bore 40. The free end face 56 of the head 50 is rounded and smooth and the end of the third passage 52 which opens endwise outwardly through the face 56 is flared as at 58.

The body 38 includes a threaded radial bore 60 formed therein opening into the bore 40 and a thumb screw-type set screw 62 is threadedly engaged in the bore 60 for projection of the inner end thereof into the bore 40.

When utilizing the tool 36, the set screw 62 is backed out so as to be free of the bore 40 and the tool 36 is then upwardly telescoped over the "pig tail" terminal end 35 of the core 28 with the bolt 46 substantially fully threaded into the counter bore 42. Then with the smooth and rounded end face 56 of the head 50 abutted against the adjacent side of the second brake arm 30, the set screw 62 is threaded inward to tightly clampingly engage the "pig tail" 35 within the bore 40. This action stationarily locates the tool 36 relative to the "pig tail" 35 and after the tool 36 has been thus installed the clamp assembly 32 is loosened by unthreading the nut 64 thereof. Thereafter, the head 50 of the bolt 46 may be turned by the knurled outer surface area 70 thereof while the body 38 is held stationary by the knurled outer surface 72, in order to back the shank 48 outward of the threaded counter bore 42. This will cause the second brake arm 30 to be adjustably shifted toward the first brake arm 24 and the brake shoes 68 of the brake assembly 18 to be shifted into closer proximity relative to the opposite sides of the rim 14. Then, assuming that proper adjustment of the brake shoes 68 has been achieved, the nut 64 is tightened to retain the adjustment of the brake assembly 18 and the set screw 62 is loosened, after which the tool 36 may be downwardly withdrawn from engagement with the "pig tail" terminal end 35 of the cable assembly core 28.

The foregoing is considered as illustrative only of the principles of the invention. Further since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed as new is as follows:

1. In combination with a cable operated bicycle caliper-type brake assembly including first and second components movable toward and away from each other to apply and release, respectively, the brake assembly and wherein one of said components stationarily mounts one end of a cable assembly housing and the other component includes a first through passage adjustably slidably receiving the corresponding end of the cable assembly core therethrough as well as releasable clamp structure for releasably securing the cable assembly core end in adjusted shifted position relative to said passage, a brake adjusting tool including an elongated body having opposite end portions and a second through passage formed longitudinally therethrough, one end portion of said body including an abutment mounted thereon for adjusted shifting longitudinally of said body outward of said one end and defining a third through passage therethrough registered with said first passage, said corresponding end of said core projecting through said first and third passages and at least partially into said second passage, said body including releasable anchor means for releasably anchoring said core end in longitudinally displaced position in said second passage, said abutment engaging the side of said other component remote from said one component and being operative, when extended relative to said one end of said body, to displace said other component toward said one component.

2. The brake assembly and tool combination of claim 1 wherein said second passage comprises a central longitudinal bore formed through said body, the end of said bore corresponding to said one end of said body including a threaded counter bore, said abutment comprising a headed bolt threaded into said counter bore, said third passage comprising a central bore formed longitudinally through said bolt.

3. The brake assembly and tool combination of claim 2 wherein said releasable anchor means includes a set screw carried by said body and generally radially projectable into the first mentioned bore.

4. The brake assembly and tool combination of claim 2 wherein said bolt includes a diametrically enlarged head having a knurled outer peripheral surface and said body includes a portion thereof defining a knurled cylindrical outer surface portion.

5. The brake assembly and tool combination of claim 2 wherein said bolt includes a diametrically enlarged head, the end of the last mentioned bore opening outwardly through said head being flared.

6. In combination with a cable operated bicycle caliper-type brake assembly including first and second components movable toward and away from each other to apply and release, respectively, the brake assembly and wherein one of said components stationarily mounts the end of a cable assembly housing and the other component includes a first through passage adjustably slidably receiving the corresponding end of the cable assembly core therethrough as well as releasable clamp structure for releasably securing said cable assembly core in adjusted shifted positions relative to said passage, a brake adjusting tool including first means releasably engageable with said corresponding end of said cable assembly core projecting outwardly of the end of said first through passage remote from said one component, second means adjustably shiftably supported from said first means and including an abutment surface for engaging the side of said other component remote from said one component and displacing said other component toward said one component upon adjustable shifting of said second means relative to said first means.

7. The method of adjusting a cable operated bicycle caliper-type brake assembly including first and second components movable toward and away from each other to apply and release, respectively, the brake assembly and wherein one of said components stationarily mounts the end of a cable assembly housing and the other component includes a through passage adjustably slidably receiving the corresponding end of the cable assembly core therethrough as well as releasable clamp structure for releasably securing said cable assembly core in adjusted shifted position relative to said passage, said method comprising providing a first element releasably clamp engageable with the end of said cable assembly core projecting outwardly of the end of said passage remote from said one component and supporting a second component therefrom adjustably shiftable relative to said first component and including an abutment surface facing in the direction in which said second component is adjustably shiftable relative to said first component, clamp engagingly supporting said first component from said cable core end, adjusting said second component relative to said first component to engage said abutment surface with the side of said other component remote from said first component, releasing said clamp structure, further adjusting said second component relative to said first component to shift said other component toward said one component, tightening said clamp structure, and thereafter releasing the clamped engagement of said first component from said end of said cable core.

* * * * *